July 7, 1942.  E. J. COOK  2,289,244
APPARATUS FOR SETTING THE CUTTING TOOL IN A REPRODUCING
MACHINE RELATIVE TO A WORK BLANK
Filed March 13, 1939  4 Sheets-Sheet 1

INVENTOR.
Everett J. Cook
BY
ATTORNEYS

July 7, 1942.    E. J. COOK    2,289,244
APPARATUS FOR SETTING THE CUTTING TOOL IN A REPRODUCING
MACHINE RELATIVE TO A WORK BLANK
Filed March 13, 1939    4 Sheets-Sheet 2

INVENTOR.
Everett J. Cook
BY
ATTORNEYS

July 7, 1942.  E. J. COOK  2,289,244
APPARATUS FOR SETTING THE CUTTING TOOL IN A REPRODUCING
MACHINE RELATIVE TO A WORK BLANK
Filed March 13, 1939  4 Sheets-Sheet 3

INVENTOR.
Everett J. Cook
BY
ATTORNEYS

July 7, 1942.  E. J. COOK  2,289,244
APPARATUS FOR SETTING THE CUTTING TOOL IN A REPRODUCING
MACHINE RELATIVE TO A WORK BLANK
Filed March 13, 1939  4 Sheets-Sheet 4
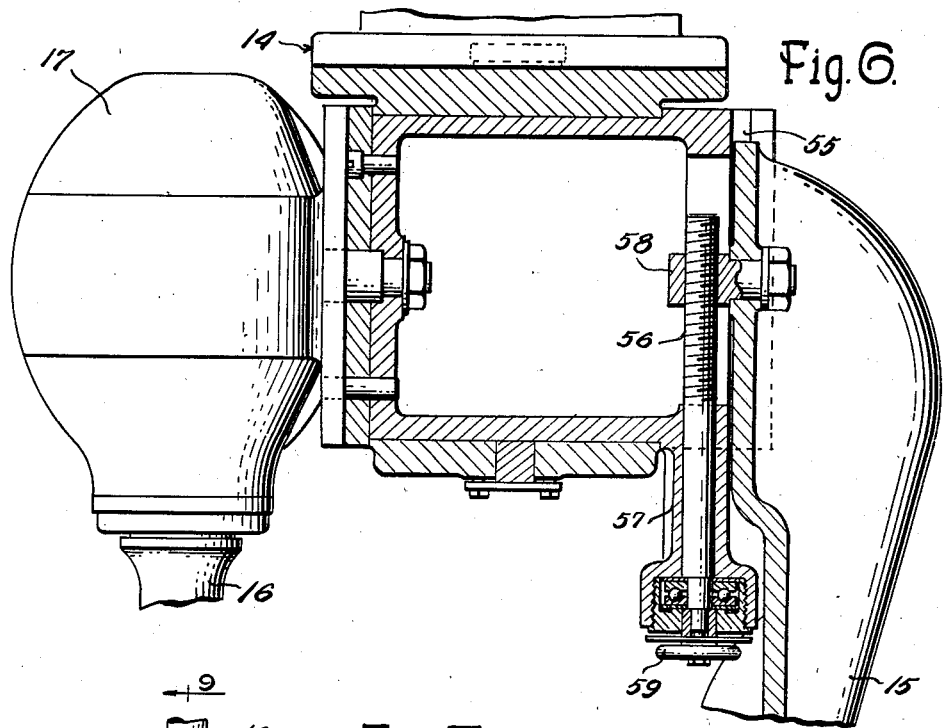
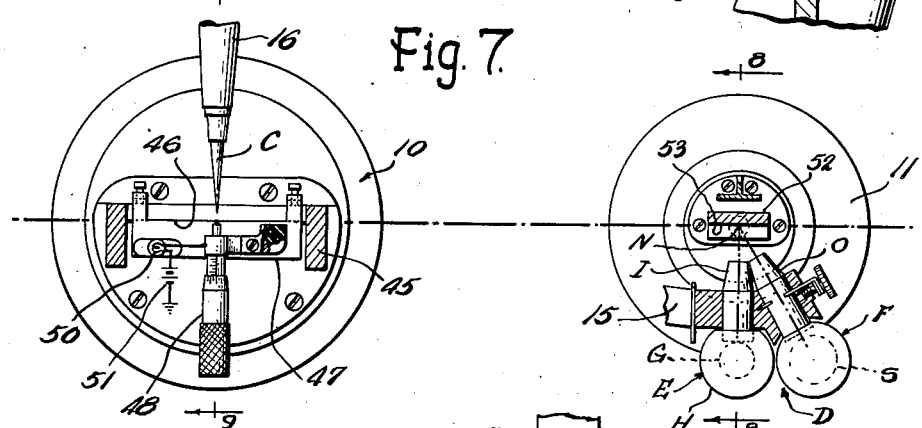
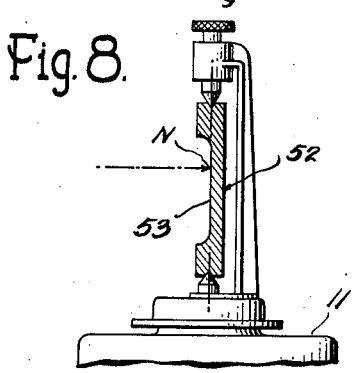
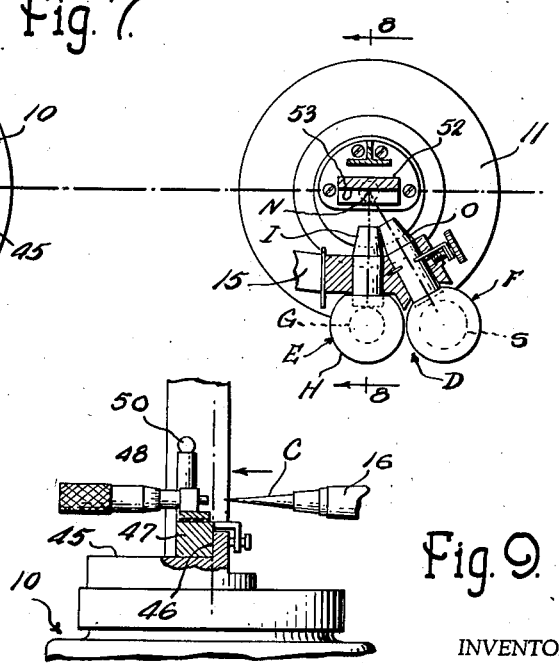
INVENTOR.
Everett J. Cook
BY
ATTORNEYS Patented July 7, 1942

2,289,244

UNITED STATES PATENT OFFICE 2,289,244

APPARATUS FOR SETTING THE CUTTING TOOL IN A REPRODUCING MACHINE RELATIVE TO A WORK BLANK

Everett J. Cook, Toledo, Ohio, assignor to H. H. Buggie & Company, Toledo, Ohio, a corporation of Ohio Application March 13, 1939, Serial No. 261,607

2 Claims. (Cl. 90—13)

This invention relates generally to apparatus for initially setting a cutting tool relative to a work blank in a reproducing machine of the type wherein relative movement of a tool and a work blank toward and away from each other is controlled by a light sensitive cell scanning a surface of a pattern to be reproduced in the work blank.

In apparatus of the general type set forth, it is necessary to accurately initially set the tool in order that the work may be formed within close limits to a predetermined or specified dimension and this invention contemplates accomplishing this result in a simple expedient manner.

Another advantageous feature of this invention which contributes materially to obtaining an accurate setting of the tool consists in the provision of apparatus wherein the extent of any light penetration in the surface of the model is automatically compensated for during setting of the tool.

The foregoing, as well as other objects, will be made more apparent as this description proceeds, especially when considered in connection with the accompanying drawings, wherein:

Figure 6 is a sectional view taken substantially on the plane indicated by the line 6—6 of Figure 2;

Figure 7 is a perspective view illustrating the work holding fixture;

Figure 8 is a semi-diagrammatic view illustrating the model support;

Figure 9 is a semi-diagrammatic sectional view illustrating the means for accurately setting the tool.

Figure 1:
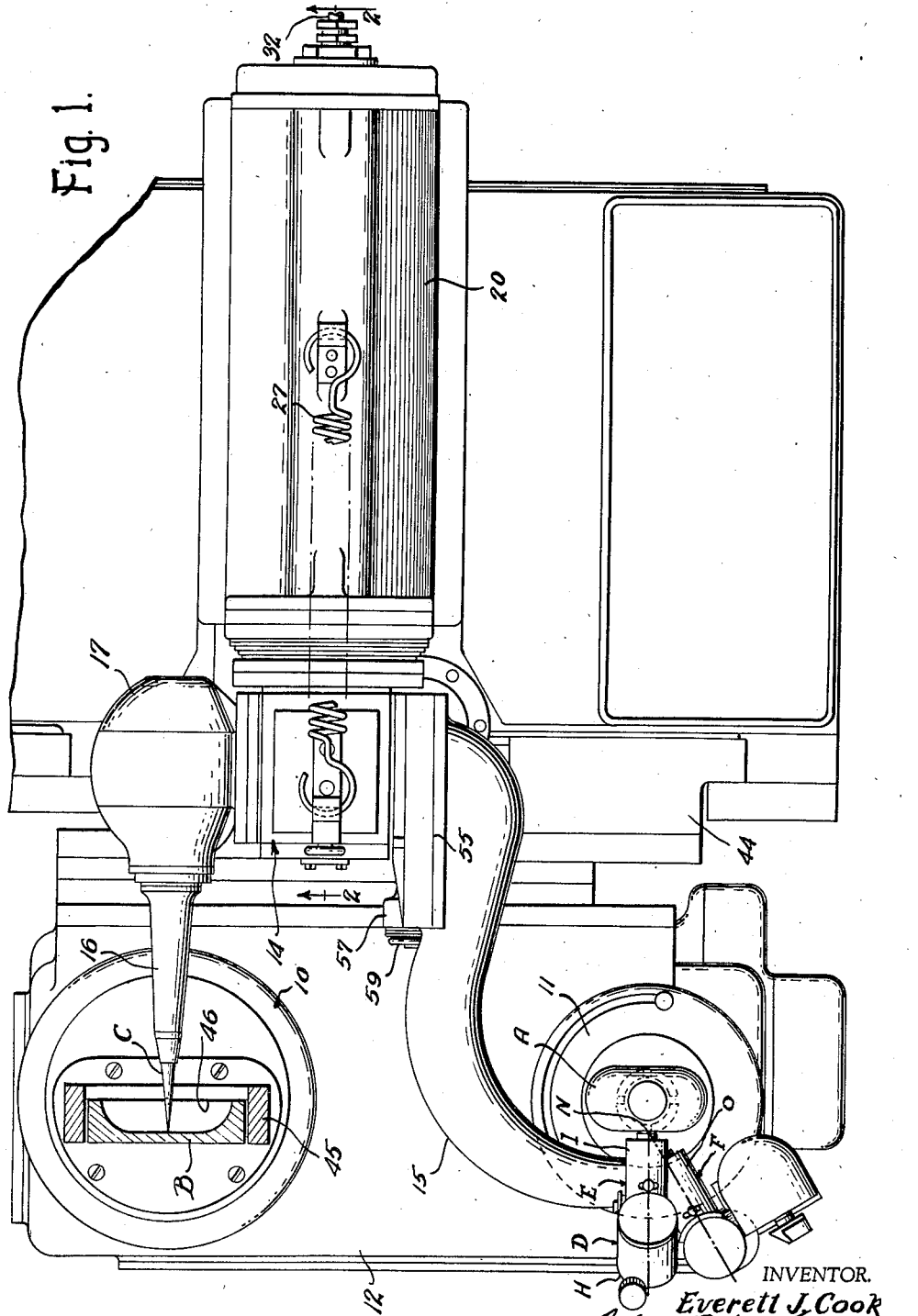
Figure 1 is a top plan view of a portion of a reproducing machine in connection with which my improved method and apparatus may be used.

For the purpose of illustrating the present invention, I have selected a machine for fashioning a mold cavity in a work blank to the exact size and shape of the article it is desired to cast, although it is to be understood that my improved method and apparatus are not limited to this specific embodiment. As a matter of fact, the present invention may be used with advantage in any apparatus where the movement of a fashioning tool relative to a work blank is controlled by an optical unit scanning a model and including a light sensitive cell responsive to changes in contour of the model.

In accordance with the specific embodiment of the invention, the mold cavity is formed of two halves which may or may not be complementary, depending upon the particular contour of the article to be formed. However, the principle of operation of the apparatus is the same in forming the two halves of the mold and, for this reason, reference will be made hereinafter to the formation of only one-half of the mold cavity.

Inasmuch as the machine shown herein is solely for the purpose of illustrating one typical application of my improved method and apparatus, it is not believed necessary to complicate this description by a detailed definition of the machine. Briefly described, it will be noted from Figure 1 that the machine comprises a work support 10 and a pattern support 11 mounted in side by side relationship on a traversing carriage 12 for oscillation by mechanism not shown herein, but which may be the same as illustrated in my Patent No. 2,154,974, dated April 18, 1939. A pattern A is mounted on the support 11 for oscillation therewith as a unit and a work blank B is secured to the support 10 for movement with the latter. The pattern corresponds exactly in shape and size to the article it is desired to cast in the mold cavity to be formed in the work blank B and is preferably formed of, or coated with a good light reflecting material.

In the present instance, the outer half of the surface of the pattern A is scanned by an optical unit D and the latter controls the movements of a tool C positioned at the inner side of the work blank B opposite the latter. Both the tool C and optical unit D are mounted on the forward end of a ram 14 supported for reciprocation toward and away from the traversing carriage 12. The optical unit D is positioned opposite the pattern A at the outer side of the latter on an arm 15 having the inner end secured to the forward end of the ram so that movement of the ram in a direction toward the carriage 12 effects a corresponding movement of the optical unit D away from the pattern A. The tool C, on the other hand, is mounted on a spindle 16 driven by an electric motor 17 secured directly to the ram so that movement of the latter toward the carriage 12 effects a movement of the tool C toward the work blank B. In other words, the arrangement is such that the tool C is fed into the work by the ram 14 when the optical unit D is moved by the ram away from the pattern A.

Figure 2:
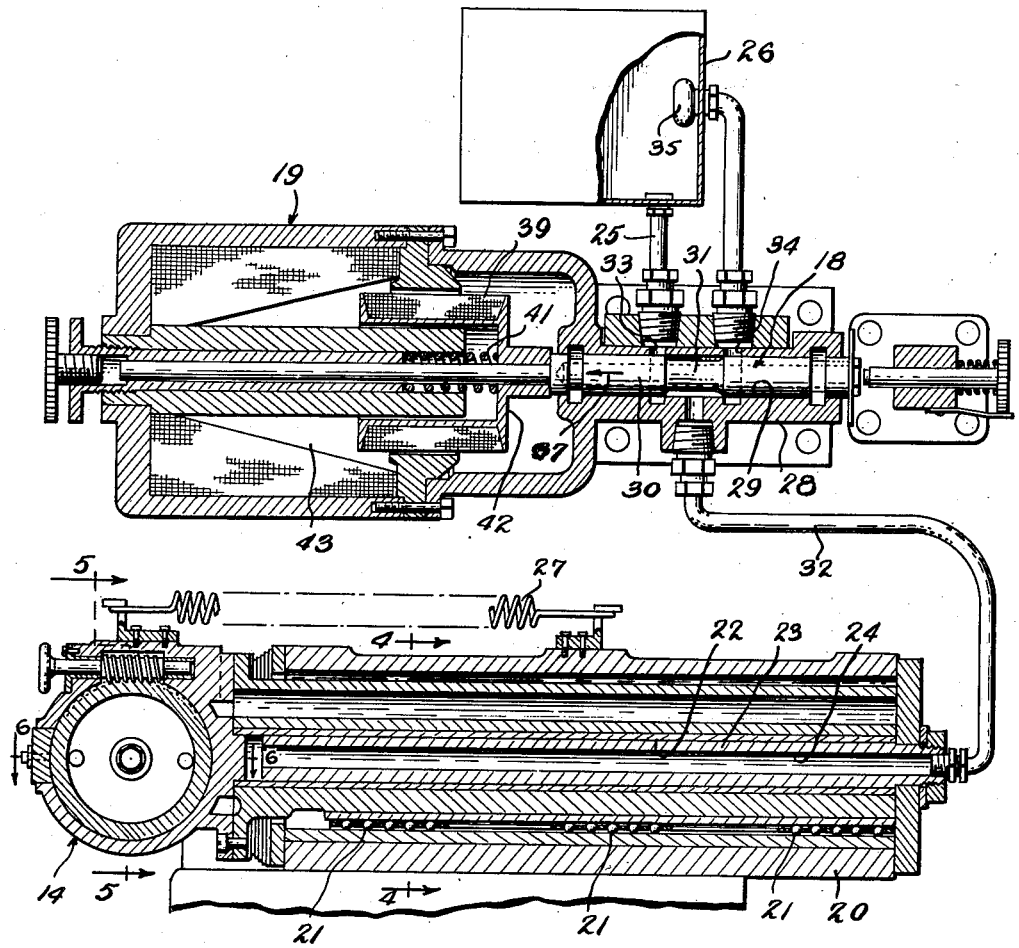
Figure 2 is a sectional view taken substantially on the plane indicated by the line 2—2 of Figure 1 and illustrating the tool operating mechanism.
Figure 4:
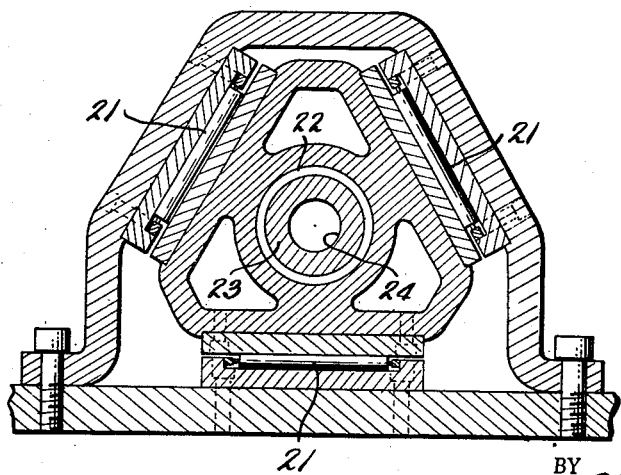
Figure 4 is a cross sectional view taken substantially on the plane indicated by the line 4—4 of Figure 2.

Upon reference to Figure 2, it will be noted that the ram 14 is operated by fluid pressure in dependence upon the operation of a valve 18 controlled by an electromagnet 19. The particular construction of the ram illustrated herein is the same in construction as the one shown in my Patent No. 2,176,666, dated October 17, 1931, and forms no part of this invention. Briefly described, the ram is triangular in cross section and slides in a casing 20 corresponding to the ram in cross section, as shown in Figure 4. A set of needle bearings 21 is supported between the opposed parallel walls of the ram 14 and casing 20 to reduce friction to a minimum. In addition, the ram is provided with a cylinder 22 slidably receiving a piston 23, which is fixedly secured to the frame of the machine against movement and is axially bored to provide the passage 24 therethrough. The rear end of the bore or passage 24 alternately communicates with a source of fluid under pressure 25 and a fluid supply tank 26 through the valve 18. The inner end of the cylinder 22 is closed by and is secured to the head of the ram so that fluid under pressure supplied to the cylinder 22 through the passage 24 in the piston 23 effects a movement of the head together with the cylinder in a direction toward the traversing carriage 12. On the other hand, when the pressure in the passage 24 is exhausted by the valve 18, the ram is moved in the opposite direction by a suitable spring 27.

The valve 18 comprises a casing 28 having a bore 29 therethrough for slidably receiving a valve plunger 30. The valve plunger 30 is formed with a reduced portion 31 intermediate the ends thereof arranged in constant communication with the rear end of the passage 24 through the piston 23 by a conduit 32 and respectively establishes communication between the bore or passage 24 and ports 33 and 34 as the plunger 30 moves in opposite directions from the neutral position shown in Figure 2. The port 34 communicates with the discharge side of a suitable pump 35 located within the fluid supply tank 26 and the port 33 communicates with the tank 26. The arrangement is such that movement of the plunger 30 in the direction of the arrow 37 from the position shown in Figure 2 establishes communication between the passage 24 and the port 33 communicating with the supply tank 26. As a result, fluid pressure is exhausted from the ram and the latter is moved in a direction away from the traversing carriage by the spring 27. In other words, the tool C is withdrawn from the work and the optical unit D is moved toward the pattern A. Of course, movement of the valve plunger 30 in a direction opposite the direction of the arrow 37 establishes communication between the passage 24, through the piston 23, and the port 34 communicating with the pump 35. As a result, fluid under pressure is built up in the passage 24 and the ram is moved by fluid pressure against the action of the spring 27 in a direction to feed the tool C into the work B and to move the optical unit away from the pattern A.

In the illustrated embodiment of the invention, the valve plunger 30 is moved in a direction to withdraw the tool from the work by energizing a load coil 39 of the electromagnet 19 and is moved in the opposite direction to effect feeding of the tool into the work by a spring 41 acting on the armature 42 of the electromagnet to resist movement of the load coil 39 into the magnetic field 43.

The operation of the electromagnet is controlled by the optical unit D in accordance with changes in shape of the surface of the pattern scanned. The optical unit D comprises a light projector E and a light sensitive cell device F supported on the arm 15 in fixed angular relation to the projector. The light projector E has a source of illumination G housed by a casing H and registering with the outer end of a lens barrel I having condenser lenses J secured in the outer end thereof and having objective lenses K secured in the inner end of the same. A plate or diaphragm M is located between the two lenses and is formed with a slot L therethrough of a shape predetermined to cast an illuminated image on the surface of the pattern A having a sharply defined contour line N.

Figure 3:
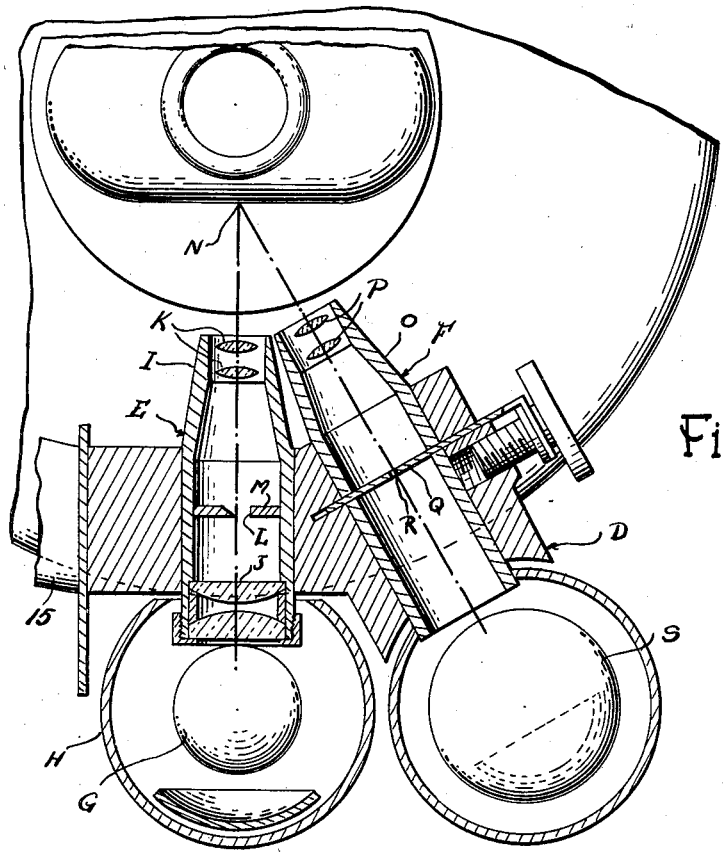
Figure 3 is a semi-diagrammatic sectional plan view of the optical system employed in the reproducing machine shown in Figure 1.

The photoelectric cell device F is also provided with a lens barrel O having its axis in a common horizontal plane with the axis of the projector lens barrel I and having objective lenses P fixed in the inner end thereof. The axis of the lens barrel O converges toward the axis of the projector lens barrel I and intersects the latter axis at a point spaced inwardly beyond the inner ends of the lens barrels for reasons to be more fully hereinafter set forth. In addition, the photoelectric cell device F is provided with a light sensitive cell in the form of a phototube S supported in a suitable light tight casing joined with the outer end of the lens barrel O to receive light passing through the latter. In this connection, it will be noted from Figure 3 that a plate Q is secured in the lens barrel O between the lenses P and the light sensitive cell S. This plate Q is provided with a restricted aperture R therethrough located substantially on the axis of the lens barrel O and may be properly termed the line of sight of the phototube S since the latter is affected only by the light escaping through the aperture R.

It has previously been stated that the axis of the projector lens barrel I and the axis of the phototube lens barrel O are arranged in fixed angular relationship. The angle between these two axes is so determined that when the tool is properly set with reference to the work blank B, the axes of the lens barrels intersect at the surface of the pattern A or, in other words, the aperture R straddles the contour line N of the image reflected from the pattern on the plate Q.

The entire surface of the pattern A to be reproduced in the work blank B is, of course, scanned by the optical unit D and exactly the same area of the work blank is necessarily traversed by the tool C. As stated above, the pattern support and work support are mounted on the traversing carriage 12. This carriage is movable back and forth by mechanism, not shown herein, and is also fed vertically by a carriage 44, generally shown in Figure 1. The carriage 44 is raised by a step by step movement and the means for accomplishing this result is not shown herein, but may be similar to the means provided for this purpose in my Patent No. 2,154,974, dated April 18, 1939. Reference has also been made to the fact that the work blank B and pattern A are oscillated about their vertical axes. This is particularly desirable in cases where the sides of the article to be formed are on a radius in that it renders it possible to maintain the tool substantially normal to the surface being cut.

With the above in mind and remembering that the angle between the light beam and line of sight of the light sensitive cell remains constant throughout the traversing operation, it follows that as the surface of the pattern A approaches the optical unit D, the image reflected on the plate Q is shifted relative to the aperture R in a direction to diminish the intensity of light passing through the aperture R to the light sensitive cell S. Such action has the effect of reducing the current flowing through the load coil 39 of the electromagnet 19 to such an extent that the spring 41 operates the valve 18 to supply fluid pressure to the passage 24 in the ram 14 and effect movement of the ram 14 in a direction to feed the tool C into the work. It will, of course, be understood that movement of the tool C in the above direction causes a corresponding movement of the optical unit D away from the pattern and this movement continues until the aperture R intercepts the illuminated portion of the image. As the intensity of light passing through the aperture R is increased by interception of the aperture R with the illuminated portion of the image, the quantity of current flowing through the load coil of the electromagnet 19 is correspondingly increased and becomes sufficient to counteract the spring 41 and operate the valve 18 to permit movement of the ram 14 in a direction to withdraw the tool C from the work by the spring 27. As a result, the aperture R is maintained in straddling relationship with the contour line N and, since this contour line represents a section of the pattern as viewed from the light sensitive cell S, it follows that an exact replica of the surface of the pattern scanned is produced in the work blank B.

Although it follows from the foregoing that the tool is moved toward and away from the work blank in accordance with changes in contour of the model A to reproduce the latter in the work, nevertheless, the work is fashioned to a predetermined or specified dimension, regardless of the dimension of the model, by initially accurately setting the tool relative to the work blank support 10. Upon reference to Figure 1, it will be noted that the work blank B is mounted on the support 10 by a fixture 45 having a vertical shoulder 46 at the bottom thereof disposed in a plane including the axis of oscillation of the support 10 and forming an abutment for positioning the work blank B on the fixture. However, prior to positioning the work blank B on the fixture 45, a straight edge 47 is mounted on the fixture against the shoulder 46 and a micrometer 48 is supported on the straight edge 47 directly opposite the cutting end of the tool C for engagement by the latter. The arrangement is such that movement of the tool C toward the straight edge 47 engages the cutting end of the tool with the micrometer 48, and the latter is carefully adjusted with respect to the vertical plane of the shoulder 46 to accurately locate the cutting end of the tool in relation to this plane. The adjustment of the micrometer 48 is accurately predetermined in dependence upon the specified capacity of the cavity to be formed in the work blank, with the result that the tool will fashion the cavity to the specified dimension or volume, regardless of the dimension of the pattern A. In other words, if it is found by comparing the volume represented by the model with the predetermined specified capacity of the mold that a deeper cut is necessary in the work blank, the micrometer 48 is adjusted so that the end thereof adjacent the tool is moved in the direction of the arrow in Figure 9 from the plane of the shoulder 46 a distance corresponding to the predetermined increase in the depth of cut of the tool required to accurately fashion the work blank to the specified volume. On the other hand, if it is found that the volume represented by the model is greater than the specified capacity of the mold cavity to be formed in the work blank, the micrometer 48 is adjusted to move the end thereof adjacent the tool across the plane of the shoulder 46 toward the tool the extent required to reduce the depth of cut of the tool C in the work blank.

In accordance with the present invention, means is provided for indicating the interval that the cutting end of the tool engages the adjacent end of the micrometer 48. As shown in Figure 7, a signal 50, in the form of a lamp bulb, is located in a circuit having one end grounded on the machine through a source of electrical energy 51 and having the opposite end electrically connected to the micrometer, which is insulated from the straight edge 47. As a result, when the tool C is moved into contact with the micrometer 48, the circuit is closed and the light 50 illuminated.

According to the present invention, the tool C is moved toward and away from the micrometer 48 by effecting an adjustment of the ram 14 toward and away from a gauge 52, shown in Figure 8 as mounted on the support 11. The gauge 52 is preferably interchangeable with the model A and is scanned by the optical unit D. The portion of the gauge 52, scanned by the optical unit D, is recessed to provide a surface 53 disposed in a vertical plane including the axis of oscillation of the model support 11. Inasmuch as the axis of oscillation of the model support 11 is located in a common plane with the axis of oscillation of the work support 10, it follows that the plane of the surface 53 is the same plane in which the shoulder 46 is located.

It will be understood from the foregoing description of the action of the optical unit D that the latter remains a fixed distance from the surface 53 of the gauge and, accordingly, any adjustment of the arm 15 in a direction toward the ram 14 will effect a movement of the tool C toward the micrometer 48 by the fluid pressure while any adjustment of the arm 15 in the opposite direction effects a movement of the tool C away from the micrometer 48 by the spring 27. When the tip of the tool C engages the micrometer 48, the adjustment is completed and the gauge 52 is replaced by the model. Also, the straight edge 47 with the micrometer 48 is replaced by the work blank and the machine is then in condition for operation.

It has been stated above that the extent of light penetration into the model is automatically compensated for during adjustment of the tool C. This result is accomplished herein by forming or coating the gauge 52 with the same material used in coating or forming the model A.

Figure 5:
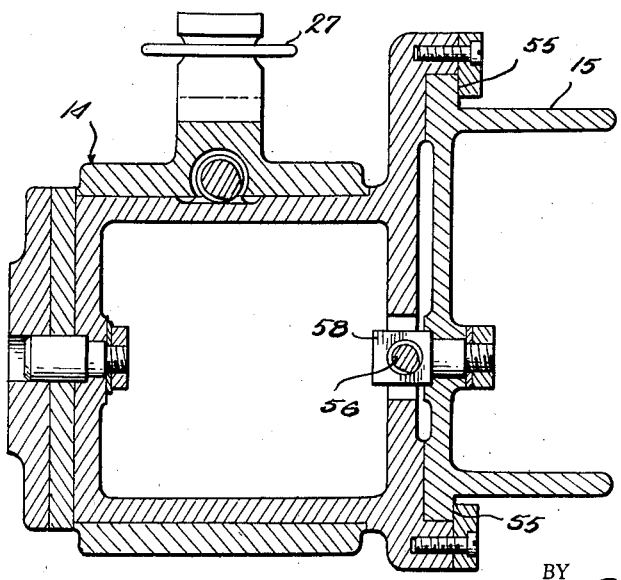
Figure 5 is a sectional view taken substantially on the plane indicated by the line 5—5 of Figure 2.

In Figures 1, 5 and 6, I have shown one specific mechanism for adjusting the arm 15. As will be noted from these figures, the arm 15 is slidably supported on the head of the ram 14 in ways 55 extending in the direction of movement of the ram 14. A screw 56 is rotatably supported in an extension 57 formed on the head of the ram and threadedly engages a lug 58 suitably secured to the arm 15 in such a manner that rotation of the screw 57 effects a sliding movement of the arm 15 relative to the ram 14 in one direction or the other depending upon the direction of rotation of the screw. As shown in Figure 6, the screw is provided with a control 59 located for convenient manipulation by the operator to effect the proper adjustment of the tool.

What I claim as my invention is:

1. In a reproducing machine having a support for a model and a work blank, a tool positioned opposite the work blank support, a gauge member mounted on the model support with a portion of one surface predeterminedly positioned with respect to the position assumed by the work blank when mounted on the work support, an optical system positioned opposite the gauge member for scanning the surface aforesaid of the latter and comprising, means for casting an image on the gauge member with a contour line separating the illuminated area of the image from the shaded area and a light sensitive cell having an aperture intersecting the contour line, the image casting means and the light sensitive cell being predeterminedly positioned to cause the aperture to alternately intercept the illuminated and shaded areas at opposite sides of the contour line upon relative movement of the optical system and model support toward and away from each other, means controlled by the light sensitive cell to effect relative movement of the optical system and model support toward and away from each other to maintain the aperture on the contour line and to also effect relative movement of the tool and work support toward and away from each other, adjustable means for relatively moving the optical system and model support toward and away from each other to effect relative adjustment of the tool and work support, adjustable means on the work support engageable with the cutting end of the tool to position the latter relative to the surface aforesaid of the gauge member when the aperture is in straddling relation with the contour line on the latter surface, and means for indicating engagement of the tool with the last named adjustable means.

2. In a reproducing machine having a support for a model and a work blank, a tool positioned opposite the work blank support, a gauge member mounted on the model support with a portion of one surface predeterminedly positioned with respect to the position assumed by the work blank when mounted on the work support, an optical system positioned opposite the gauge member for scanning the surface aforesaid of the latter and comprising, means for casting an image on the gauge member with a contour line separating the illuminated area of the image from the shaded area and a light sensitive cell having an aperture intersecting the contour line, the image casting means and the light sensitive cell being predeterminedly positioned to cause the aperture to alternately intercept the illuminated and shaded areas at opposite sides of the contour line upon relative movement of the optical system and model support toward and away from each other, means controlled by the light sensitive cell to effect relative movement of the optical system and model support toward and away from each other to maintain the aperture on the contour line and to also effect relative movement of the tool and work support toward and away from each other, means for relatively adjusting the tool and work support toward and away from each other, and adjustable abutment means on the work support engageable with the cutting end of the tool to predeterminedly locate the latter relative to the surface aforesaid of the gauge member when the aperture is in intersecting relation with the contour line on the latter surface of the gauge member.

EVERETT J. COOK.